(12) United States Patent
Heger et al.

(10) Patent No.: US 7,671,576 B2
(45) Date of Patent: Mar. 2, 2010

(54) RATIOMETRIC AC WIRE TRACER

(75) Inventors: Charles E. Heger, Saratoga, CA (US);
Richard Halliday, San Jose, CA (US)

(73) Assignee: Zircon Corporation

( * ) Notice: Subject to any disclaimer, the term of this patent is extended or adjusted under 35 U.S.C. 154(b) by 0 days.

(21) Appl. No.: 12/397,241

(22) Filed: Mar. 3, 2009

(65) Prior Publication Data

US 2009/0224747 A1  Sep. 10, 2009

Related U.S. Application Data

(60) Provisional application No. 61/034,420, filed on Mar. 6, 2008.

(51) Int. Cl.
*G01R 19/00* (2006.01)

(52) U.S. Cl. .......................... 324/66; 324/67

(58) Field of Classification Search .................. 324/66, 324/67
See application file for complete search history.

(56) References Cited

U.S. PATENT DOCUMENTS

| | | | | |
|---|---|---|---|---|
| 4,427,942 | A * | 1/1984 | Sole | 324/326 |
| 5,754,049 | A * | 5/1998 | Howell | 324/326 |
| 5,773,971 | A * | 6/1998 | Tavernetti | 324/67 |
| 6,198,271 | B1 | 3/2001 | Heger | |
| 6,529,006 | B1 | 3/2003 | Hayes | |
| 7,319,334 | B2 * | 1/2008 | Lee et al. | 324/530 |
| 7,342,537 | B2 * | 3/2008 | Pearson et al. | 342/459 |
| 2005/0194959 | A1 | 9/2005 | Miller | |

FOREIGN PATENT DOCUMENTS

| | | |
|---|---|---|
| GB | 1 509 380 | 5/1978 |
| GB | 2 255 832 A | 11/1992 |
| WO | 2004/095076 A1 | 11/2004 |

OTHER PUBLICATIONS

PCT International Search Report for International Application No. PCT/US2009/035944, Applicant Zircon Corporation, date of mailing Jul. 24, 2009 (5 pages).
PCT Written Opinion for International Application No. PCT/US2009/035944, Applicant Zircon Corporation, date of mailing Jul. 24, 2009 (6 pages).

* cited by examiner

*Primary Examiner*—Timothy J Dole
*Assistant Examiner*—John Zhu

(57) ABSTRACT

An implementation of an apparatus and method for sensing electrical wiring, for example, hidden behind a surface such as a wall is provided. The apparatus and method use multiple sensor signals, which may measure electric fields or changes in a dielectric. Pairs of signals are combined and compared to a sensed reference signal. Multiple sensors help in determining a direction or gradient to electrical wiring. Combining or averaging sensed signal before comparing the combined signal to a reference single helps to make the detection of electrical wiring less dependent on the relative orientation between the sensor and the electrical wiring.

24 Claims, 15 Drawing Sheets

A

B

C

D

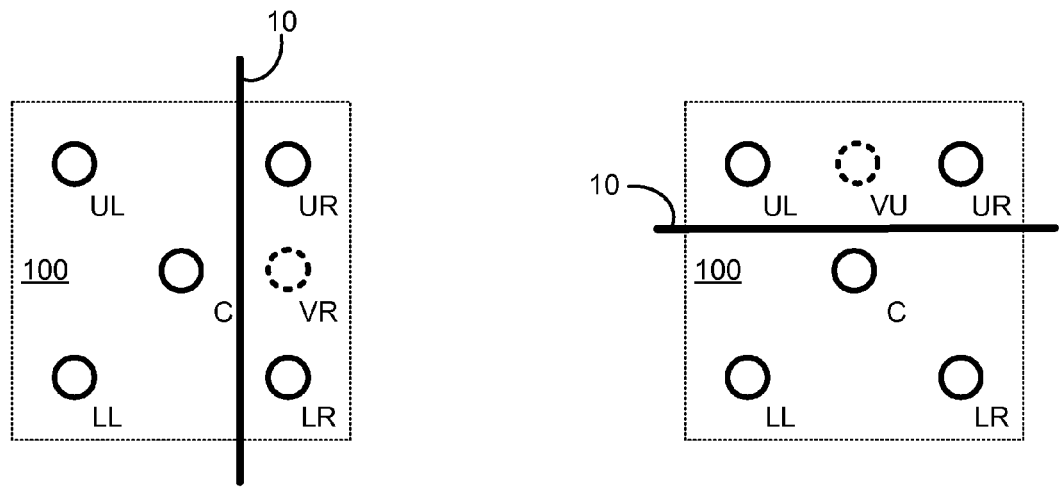
FIGURE 12B
FIGURE 12C
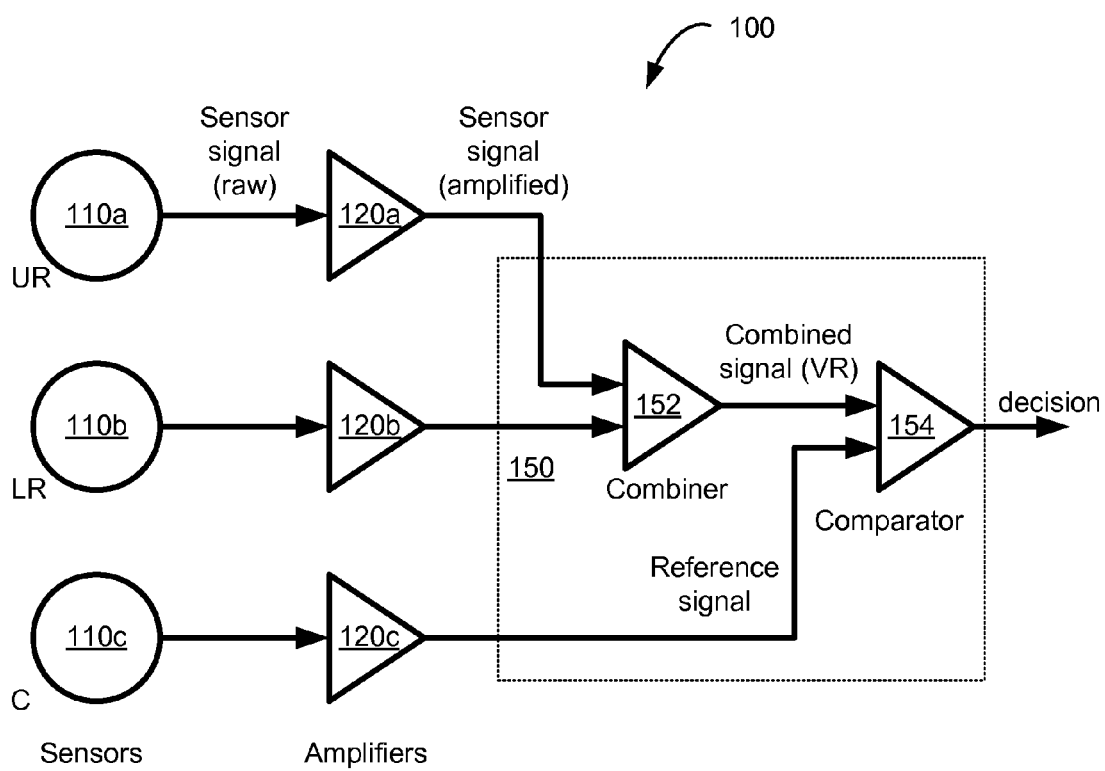
FIGURE 13A

RATIOMETRIC AC WIRE TRACER

CROSS-REFERENCE TO RELATED APPLICATIONS

This application claims priority under 35 U.S.C. §119(e) to provisional U.S. Patent Application 61/034,420, titled "RATIOMETRIC AC WIRE TRACER", filed on Mar. 6, 2008.

BACKGROUND OF THE INVENTION

1. Field of the Invention

The present invention relates to electrical-test equipment used for tracing conductors and finding hidden electrical elements.

2. Background of the Invention

Electrical work often requires identifying elements of a circuit or tracing a circuit behind a wall or other obstruction. For example, an electrician may wish to identify whether any electrical wiring exists or find electrical wiring attached to a particular wall outlet so that repairs may be made. By identifying hidden electrical wiring, the electrician can de-energize the circuit before exposing the wiring and performing repairs. For example, an electrician may wish to trace a hidden wire along a wall to locate a convenient place to add another outlet.

Some devices for locating and identifying electrical circuits use a transmitter and a receiver. A transmitter induces a current signal on the circuit in question. A receiver senses the induced signal. For a further description of a circuit finders using a transmitter-receiver pair, see U.S. Pat. No. 6,933,712 by Miller, et al. on Aug. 23, 2005, titled "Electrical circuit tracing and identifying apparatus and method", the contents of which are included herein by reference.

Other sensing devices for locating and identifying electrical circuits and energized AC wiring use only a handheld receiver and rely on either changes in capacitance or a received electric field. Such devices are dependent on the environment. Such factors include the types of and dimensions of materials used in constructing the wall as well as the distance between the sensor and the wiring. These sensors operate by determining a threshold, which marks a boundary between the presence of a target and the absences of that target. The threshold is variable and is susceptible to variations in construction, thickness of the wall and subtle changes in temperature and humidity. Even the dielectric characteristics of the material used in an operator's shoes and how the operator holds the device may play a factor in the determined threshold. If an operator moves to a different floor material or the wall construction differs during operation, the determine threshold value may become ineffective and the sensor may fail to operate as intended.

In sum, the environment leads to unpredictability and uncertainty requiring careful calibration. For a sensor to have sufficient sensitivity and have the flexibility to operate in various environments, a sensor must be calibrated for that particular environment. If a sensor is not properly calibrated, the sensor may be less sensitive (e.g., if the threshold is too high) or give false-positive readings (e.g., if the threshold is too low).

The above-described conventional sensors require either a secondary transmitter or a step of threshold calibration. Therefore, a need exists to reduce or eliminate environmental variables leading to inaccurate sensor indications, thus providing an operator of a handheld sensing device with the ability to find hidden electrical wiring without relying on a secondary transmitter or reducing the emphasis placed on the initial threshold calibration step.

SUMMARY

Some embodiments of the present invention provide for a handheld device to sense electrical wiring, the device comprising: a plurality of sensor electrodes; a plurality of amplifiers each having an input port couple to a separate one of the plurality of sensor electrodes and each further having an output port; a combiner having a first input port coupled to a first one of the output ports of the plurality of amplifiers, a second input port coupled to a second one of the output ports of the plurality of amplifiers, and an output port; a comparator having a first input coupled to the output port of the combiner, a second input coupled to a third one of the output ports of the plurality of amplifiers, and an output port; an indicator responsive a single at the output port of the comparator.

Some embodiments of the present invention provide for a handheld device to sense electrical wiring, the device comprising: a plurality of sensor electrodes comprising at least three sensor electrodes; a plurality of amplifiers each having an input port couple to a separate one of the plurality of sensor electrodes and each further having an output port; an analog-to-digital converter having a plurality of input ports each coupled to a respective one of the output ports of the plurality of amplifiers and an output port; a processor coupled to receive data from the analog-to-digital converter and to execute instructions; and memory coupled to the processor, wherein the memory contains instructions for the processor to combine data from respective pairs of sensor electrodes from the plurality of sensor electrodes and to compare respective reference signal data to each of the combined data from the respective pairs of sensor electrodes.

Some embodiments of the present invention provide for a method to sense electrical wiring, the method comprising: sensing input signals from a plurality of sensor electrodes; amplifying each of the sensed signals; combining a first pair of amplified signals resulting in a first combined signal; comparing a referenced signal to the first combined signal resulting in first comparison result; combining a second pair of amplified signals resulting in a second combined signal; comparing a referenced signal to the second combined signal resulting in second comparison result; determining a presence of the electrical wiring based on the first comparison result and second comparison result; and indicating the presence of the electrical wiring.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

FIGS. 12A to 12C show placement and use of virtual sensors, in accordance with the present invention.

DETAILED DESCRIPTION OF THE INVENTION

Figure 1:
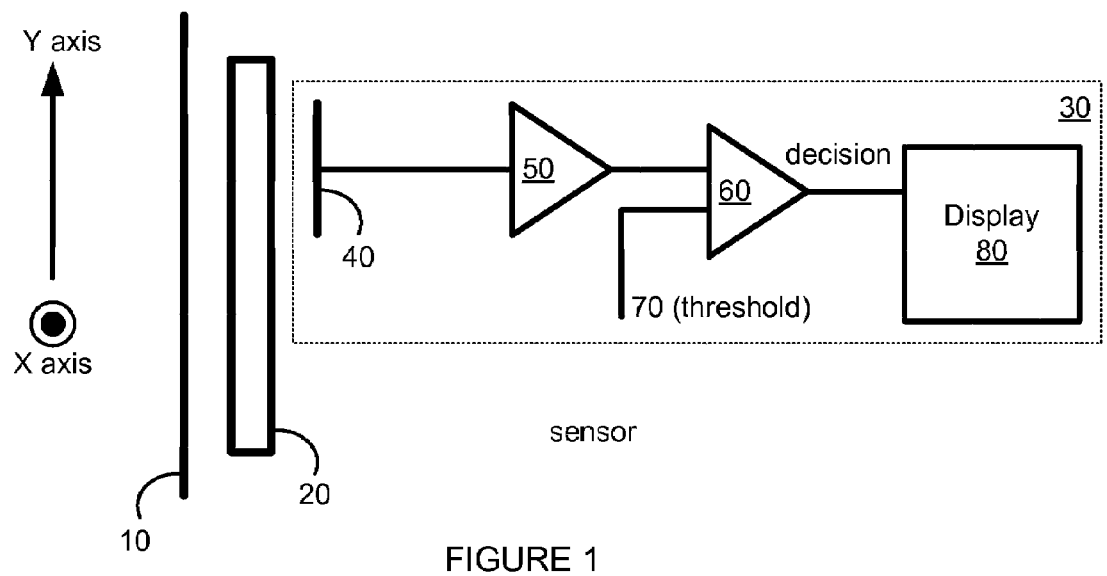
FIG. 1 shows a side view of electrical wiring 10 hidden behind a material, such as a wall 20, and a sensor 30.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are conceived here to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof. In a hardware implementation, for example, a processing unit may be implemented within one or more application specific integrated circuits (ASICs), digital signal processors (DSPs), digital signal processing devices (DSPs), programmable logic devices (PLDs), field programmable gate arrays (FPGAs), processors, controllers, micro-controllers, microprocessors, electronic devices, other devices units designed to perform the functions described herein, and/or combinations thereof.

Throughout this specification, reference may be made to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Embodiments of the present invention provide the ability to identify energized alternating current (AC) wiring while reducing the occurrence of false readings. Some embodiments of the current invention use a family of sensing electrodes with one being used as a reference electrode thereby eliminating common mode sensing errors. For a further description of common mode sensing and multi-electrode AC sensing devices having references electrodes, see U.S. Pat. No. 5,773,971 by Tavernetti on Jun. 30, 1998, titled "Three electrode AC detection", the contents of which are included herein by reference.

FIG. 1 shows a side view of electrical wiring 10 hidden behind a material, such as a wall 20, and a handheld device 30 used to sense the electrical wiring. The electrical wiring 10, when energized, produces an electric field surrounding the wire, which passes through the wall and is sensed by the device 30. The device 30 includes a sensing electrode 40, an amplifier 50, a threshold detector 60 and a display 80. The electric field received at the electrode 40 is sensitive to the dielectric material around the sensing electrode 40. The sensing electrode 40 may simply be a metallic pad or may also contain active circuitry. A signal generated by an electric field induced on the sensing electrode 40 passes from the electrode 40 to the amplifier 50, which produces an electronic signal for comparison by the threshold detector 60. The threshold detector 60 compares the amplified signal with a predetermined reference signal 70. If the amplified signal is greater than the reference signal, a decision may be made that electrical wiring is present beneath the device 30. A display device 80 may be used to indicate to an operator that electrical wiring has been detected. Hysteresis may be used to reduce a blinking effect when the amplified signal is approximately equal to the threshold value.

Figure 2A:
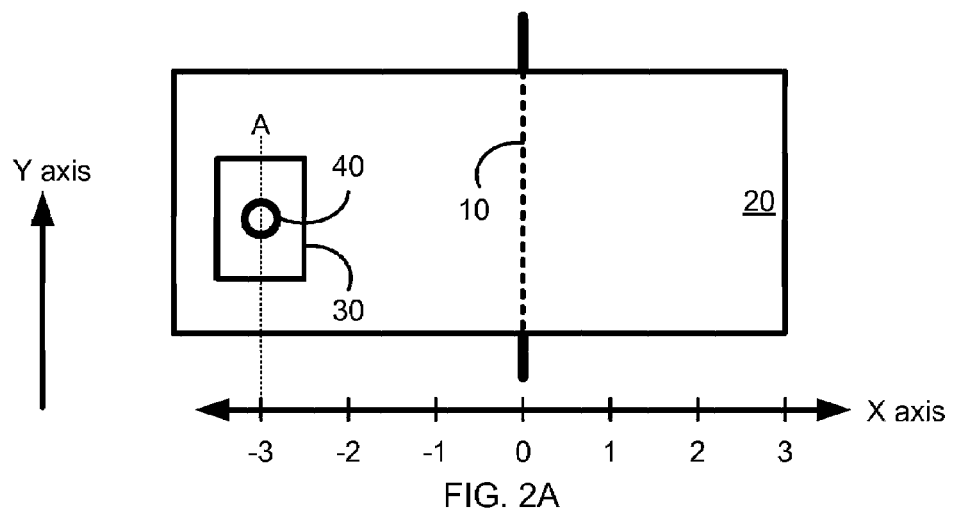
FIG. 2A shows front view of the electrical wiring 10, wall 20 and sensor 30.
Figure 2B:
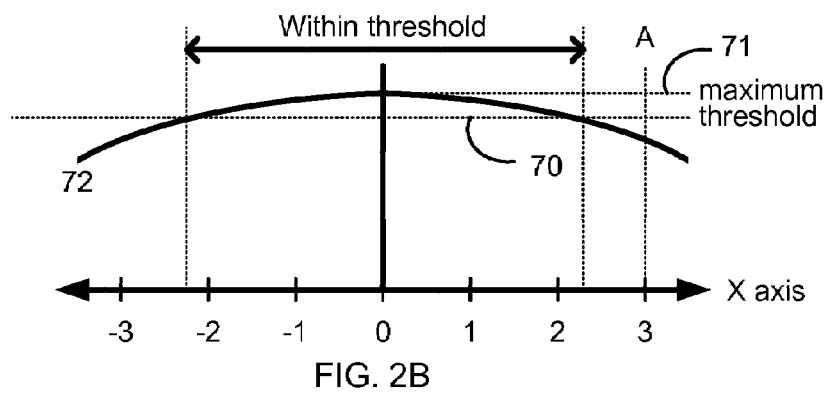
FIG. 2B illustrates a sensed measurement along a wall 20 at various distances between the electrical wiring 10 and the sensor 30.
Figure 3A:
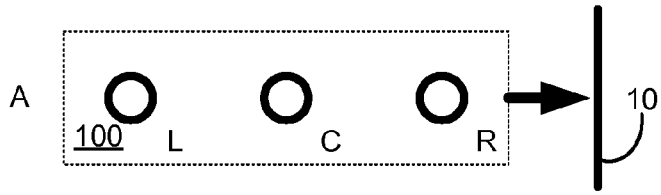
FIGS. 3A to 3D show device placement with respective to electrical wiring 10 and a three-electrode sensor device 100, in accordance with the present invention.
Figure 3B:
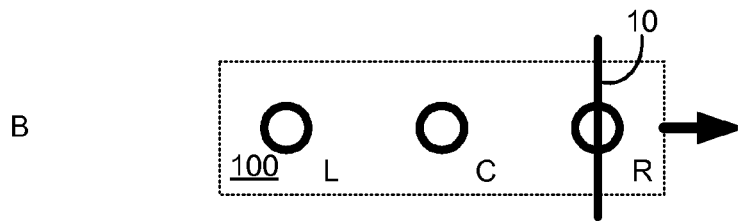
Figure 3C:
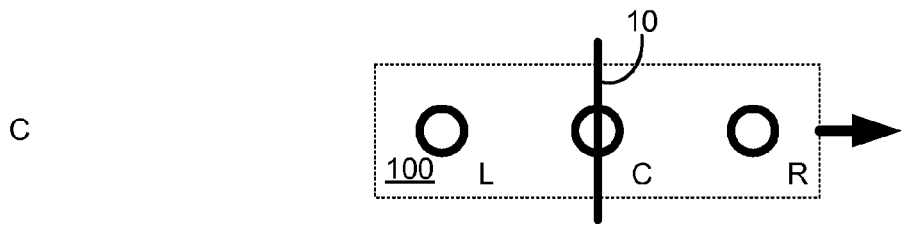
Figure 3D:
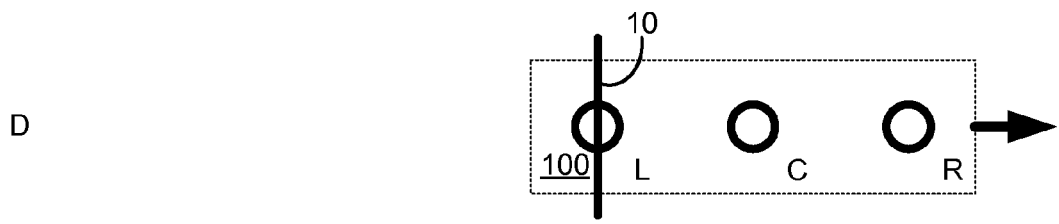

FIG. 2A shows front view of the electrical wiring 10, wall 20 and handheld device 30 of FIG. 1. As the device passes from left to right (along the X axis), the amplified signal gradually changes in intensity as shown in the not-to-scaled drawing of FIG. 2B. FIG. 2B illustrates sensed measurements 72 along a wall 20 at various distances between the electrical wiring 10 and the handheld device 30. The sensed measurements 72 may represent maximum voltage of the amplified signal, which is typically a cyclical signal corresponding to the alternating current (AC) frequency running through the electrical wiring 10. Though the sensor electrode 40 sense a sequence of amplitudes representing a sinusoidal signal, for simplicity, it is assumed that the sensed signal 72 is the maximum of the sensed signals across a cycle and the non-maximum signals of the sinusoid are discarded.

A maximum point 71 of the sensed measurements 72 represents a point (or line) along the surface of the wall 20 at which the device 30 and sensor electrode 40 are closest to the electrical wiring 10. The sensed measurements 72 gradually decreases as the distance between the electrical wiring 10 and the device 30 increases. The comparator 60 compares a predetermined threshold 70 to the sensed measurements 72. When the sensed measurements 72 are greater than the predetermined threshold 70, the comparator 60 outputs a decision signal indicating that the device 30 is above the electrical wiring 10. When the sensed measurements 72 are less than the predetermined threshold 70 (e.g., at position 'A' 3 units from the center a position '0'), the comparator 60 outputs a decision signal indicating that the device 30 is not above any electrical wiring. The decision signal may be used by a display 80 to inform an operator of the presents of the electrical wiring 10.

FIGS. 3A to 3D show device placement with respective to electrical wiring 10 and a three-electrode sensor device 100, in accordance with the present invention. The sensor device 100 includes multiple sensor electrodes. The device 100 shown include a left 'L' electrode, a center 'C' electrode and a right 'R' electrode. In a first position 'A' shown in FIG. 3A, the device 100 is at a distance way from the electrical wiring 10. In a second position 'B' shown in FIG. 3B, the right 'R' electrode is shown positioned over the electrical wiring 10. In a third position 'C' shown in FIG. 3C, the center 'C' electrode is shown positioned over the electrical wiring 10. In a fourth position 'D' shown in FIG. 3D, the left 'L' electrode is shown positioned over the electrical wiring 10.

Figure 4:
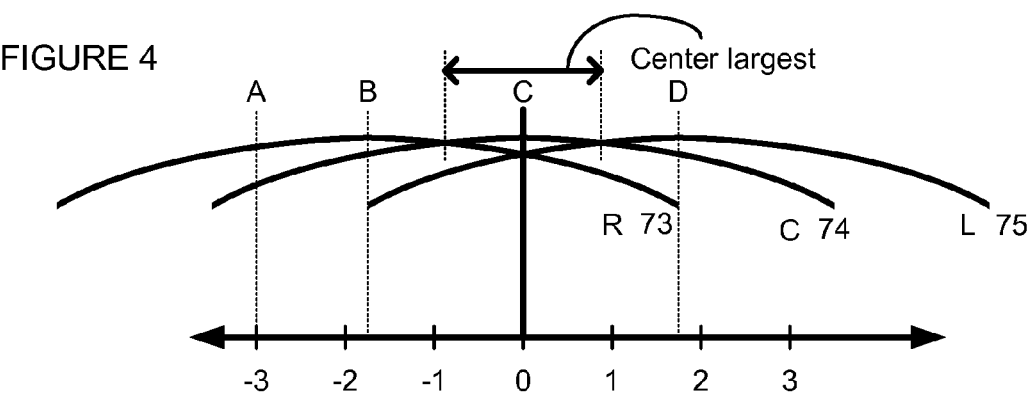
FIG. 4 illustrates sensed measurements along a wall 20 at various distances between the electrical wiring 10 and a device 100 of FIGS. 3A to 3D, in accordance with the present invention.

FIG. 4 illustrates sensed measurements along a wall 20 at various distances between the electrical wiring 10 and a device 100 of FIGS. 3A to 3D, in accordance with the present invention. In FIG. 4, the curve 72 of FIG. 2B is repeated at 73, 74 and 75; once for each sensor electrode in device 100. At position 'A', the right 'R' sensor electrode has the largest maximum amplitude of the three sensed measurements as expected. When comparing amplitudes to find a larger amplitude, the sign of the signal may be ignored and only magnitudes are compared. When sensor electrode 'R' is centered over the electrical wiring, the sensed measurements 73 is at its maximum. Similarly, when sensor electrode 'C' and 'L' are centered over the electrical wiring, the sensed measurements 74 and 75 are respectively at their maximums. A decision that the device 100 is centered over the electrical wiring 10 may be made by comparing the sensed measurements 74 from the center 'C' electrode with measurements from the other two electrodes. For example, when the sensed measurements 74 are greater than both the sensed measurements 73 and 75, the device 100 may indicated that it is centered over the electrical wiring 10. Alternatively, when the sensed measurements 74 are greater than a predetermined threshold above both the sensed measurements 73 and 75, the device 100 may indicated that it is centered over the electrical wiring 10. With yet another alternative, when a scaled version of the sensed measurements 74 (e.g., a version scaled up by 10 percent) are greater than both the sensed measurements 73 and 75, the device 100 may indicated that it is centered over the electrical wiring 10.

Figure 5A:
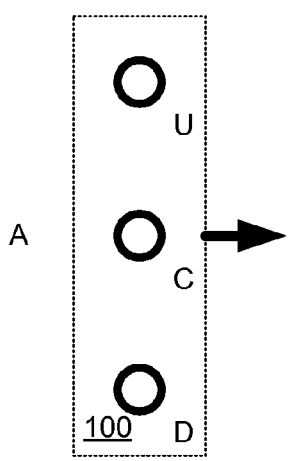
FIGS. 5A and 5B show a second orientation of device placement with respective to electrical wiring 10 and a three-electrode sensor device 100, in accordance with the present invention.
Figure 5B:
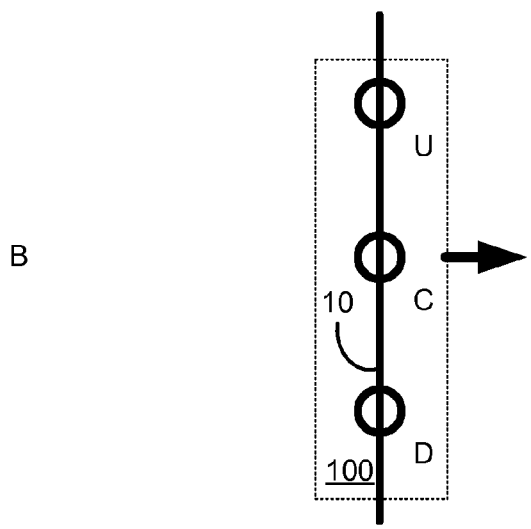

FIGS. 5A and 5B show a second orientation of device placement with respective to electrical wiring 10 and a three-electrode sensor device 100, in accordance with the present invention. The relative orientation between the device 100 and the electrical wiring 10 has been shifted by 90 degrees. The top electrode is referred to as the upper 'U' electrode, the center electrode is referred to as center 'C' and the lower electrode is referred to as down 'D'. In a first position 'A' shown in FIG. 5A, the device 100 is at a lateral distance away from the electrical wiring 10. In FIG. 5B, the device 100 is directly over the electrical wiring 10.

Figure 6:
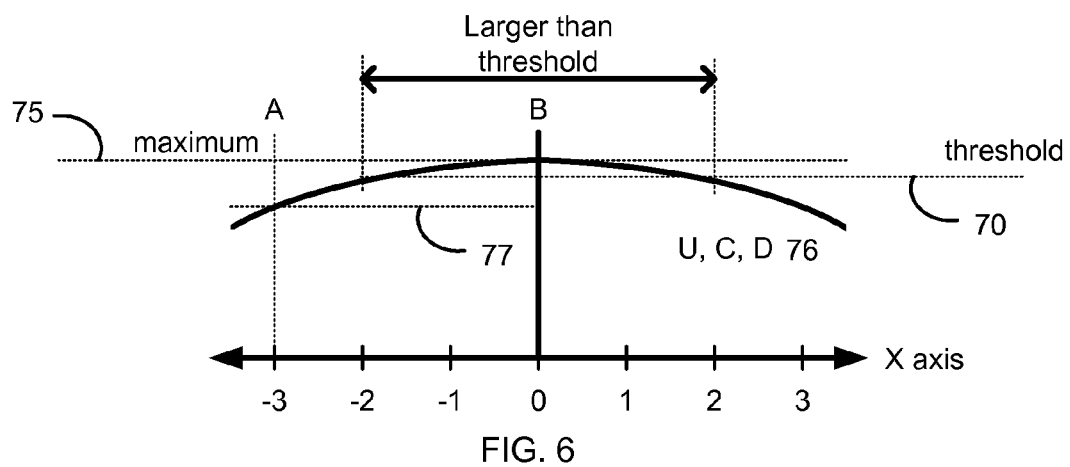
FIG. 6 illustrates sensed measurements along a wall 20 at various distances between the electrical wiring 10 and a device 100 of FIGS. 5A and 5B, in accordance with the present invention.

FIG. 6 illustrates sensed measurements 76 along a wall 20 at various distances between the electrical wiring 10 and a device 100 of FIGS. 5A and 5B, in accordance with the present invention. When the sensor electrodes (U, C, D) are in line with the electrical wiring 10, they each provide the same sensed measurements as shown by a common curve 76. Because the three sensor electrodes produce an identical signal, the method of identifying a center of the electrical wiring 10 by comparing sensor results (described above with reference to FIG. 4) may not be used. Instead, the method using thresholds (described with reference to FIG. 2B) must be used. To overcome this limitation, the multi electrode sensor may include electrodes spread across a plane rather than in a single line as described below.

Figure 7:
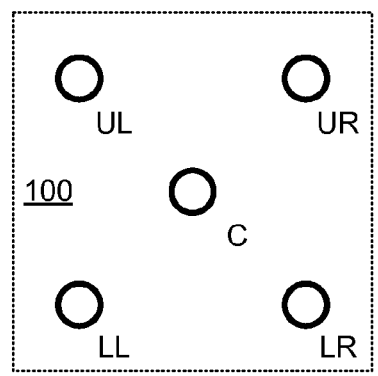
FIG. 7 shows placement of multiple sensors in a five-electrode device 100, in accordance with the present invention.
Figure 8A:
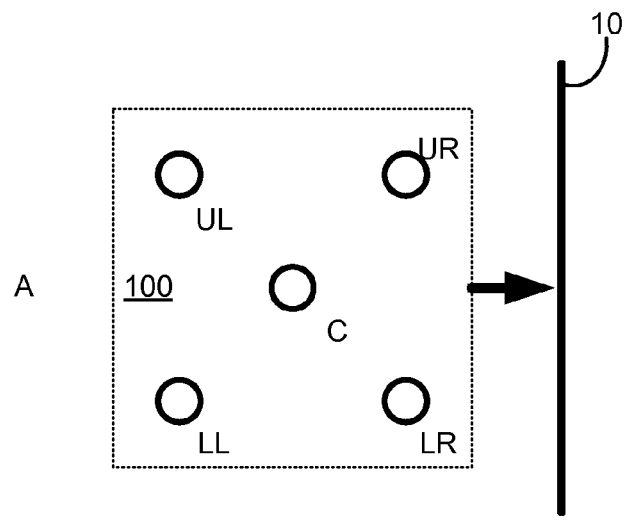
FIGS. 8A to 8D show relative placement of the device 100 of FIG. 7 with respect to the electrical wiring 10, in accordance with the present invention.
Figure 8B:
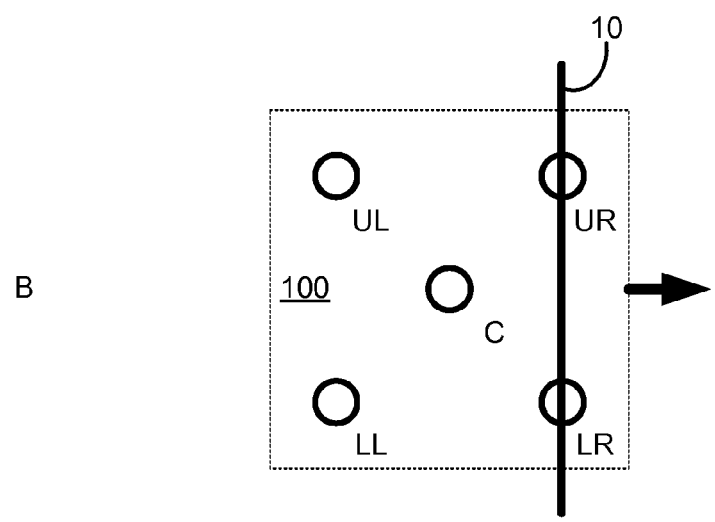
Figure 8C:
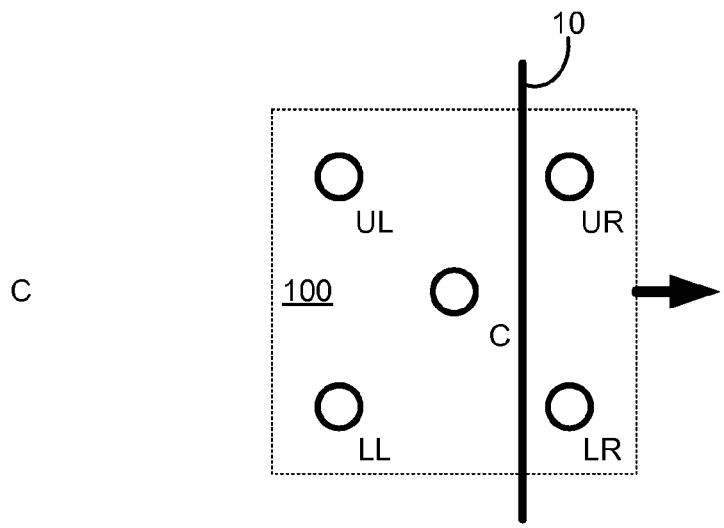
Figure 8D:
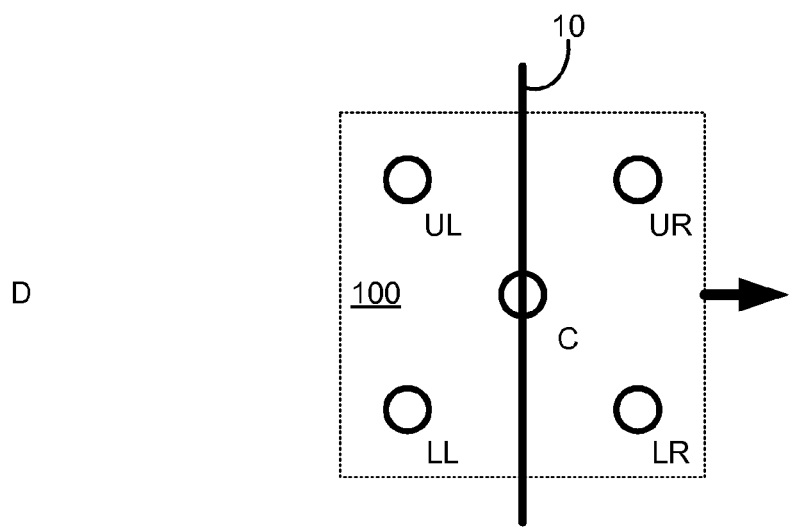

FIG. 7 shows placement of multiple sensors in a five-electrode device 100, in accordance with the present invention. The handheld device 100 includes five sensors electrodes: a first positioned in the upper right "UR", a second positioned at the lower right "LR", a third positioned at the center "C", a fourth positioned at the lower left "LL" and a fifth positioned at the upper left "UL" as shown. The center electrode "C" may be used as a reference electrode as described further below. Each of the electrodes, including the reference electrode, is of the same area such that sensed signals are equivalently amplified and relatively compared. The surrounding electrodes (UR, LR, LL & UL) define a plane and provide signals that are compared to the reference center electrode.

FIGS. 8A to 8D show relative placement of the device 100 of FIG. 7 with respect to the electrical wiring 10, in accordance with the present invention. At a first position 'A' shown in FIG. 8A, the device 100 is at a distance away from the electrical wiring 10. At a second position 'B' show in FIG. 8B, the de-vice 100 has its UR and LR electrodes centered over the electrical wiring 10. At a third position 'C' shown in FIG. 8C, the device 100 has its UR and LR electrodes and center electrode C straddling the electrical wiring 10. At a fourth position 'D' shown in FIG. 8D, the device 100 has its center electrode "C" centered over the electrical wiring 10.

Figure 9:
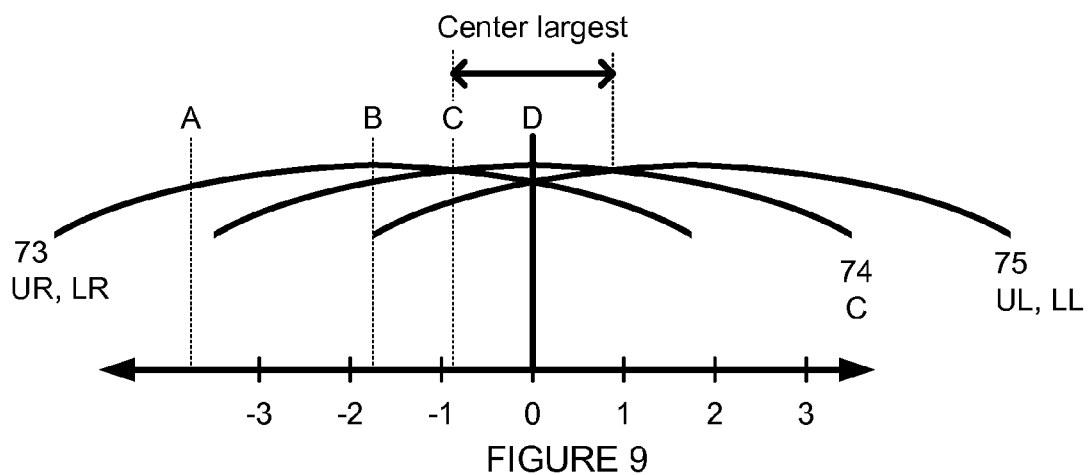
FIG. 9 illustrates sensed measurements along a wall 20 at various distances between the electrical wiring 10 and the device 100 as shown in FIGS. 8A to 8D, in accordance with the present invention.

FIG. 9 illustrates sensed measurements along a wall 20 at various distances between the electrical wiring 10 and the device 100 as shown in FIGS. 8A to 8D, in accordance with the present invention. With a vertical electrical wiring orientation with respect to the device 100, electrodes UR and LR produce sensor measurements shown by curve 73, electrode C produces sensor measurements shown by curve 74, and electrodes UL and LL produce sensor measurements shown by curve 75. As described with reference to FIG. 4, a center of the electrical wiring 10 may be determined by examining the relative measured signals. For example, when sensor measurements from electrode C are greater than or greater than a threshold above the other sensor measurements, the device 100 may be considered over the electrical wiring 10.

Unlike the three-electrode configuration described above having three inline sensor electrodes, the five-electrode configuration shown result in the center electrode being greater than at least two of the other electrodes when the electrical wiring 10 is near the center electrode. In other words, by adding electrodes across a plane, a center of the electrical wiring 10 may be identified by comparing a selected set or subset of electrodes surrounding the center electrode. In FIG. 9, a first curve 73 represents sensor measurements from the UR and LR electrodes, a second curve 74 represents sensor measurements from the center C electrode, and a third curve 75 represents sensor measurements from the UL and LL electrodes.

Figure 10A:
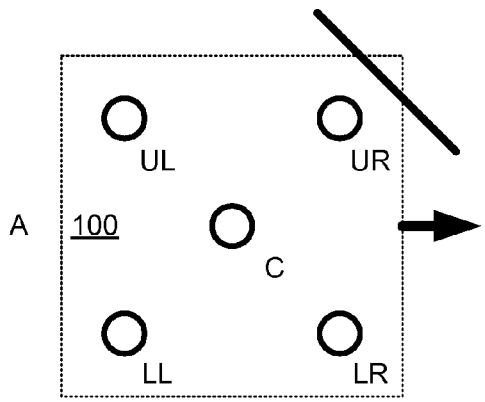
FIGS. 10A to 10D show relative placement of the device 100 of FIG. 7 with respect to the electrical wiring 10, in accordance with the present invention.
Figure 10B:
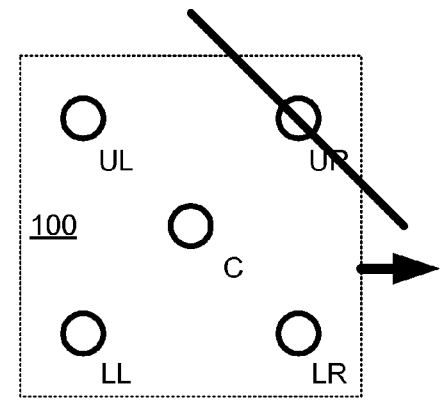
Figure 10C:
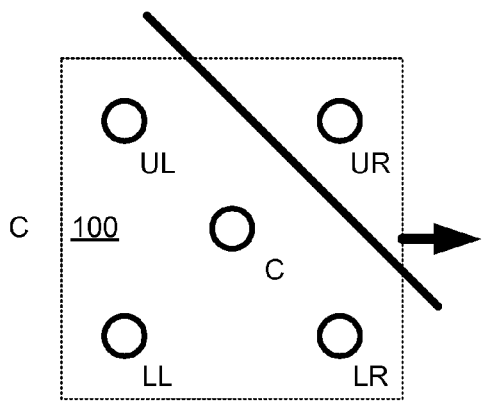
Figure 10D:
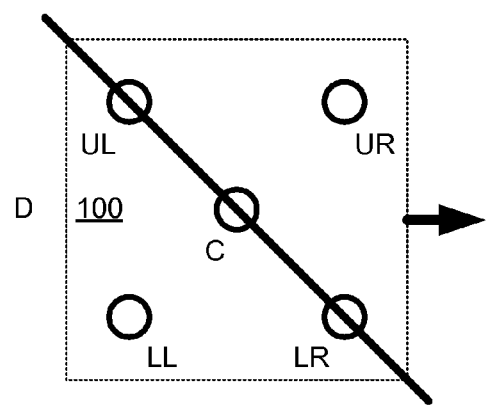

FIGS. 10A to 10D show relative placement of the device 100 of FIG. 7 with respect to the electrical wiring 10, in accordance with the present invention. The relative angle between the device 100 and the electrical wiring 10 has been shifted by 45 degrees as an example to show resulting sensor measurements. In FIG. 10A at a first position 'A', electrical wiring 10 is away from all of the sensor electrodes. In FIG. 10B at a second position 'B', electrical wiring 10 is centered on sensor electrode UR. In FIG. 10C at a third position 'C', electrical wiring 10 is centered between sensor electrodes UL, C and LR and sensor electrode UR. In FIG. 10D at a fourth position 'D', electrical wiring 10 is centered on sensor electrodes UL, C and LR.

Figure 11:
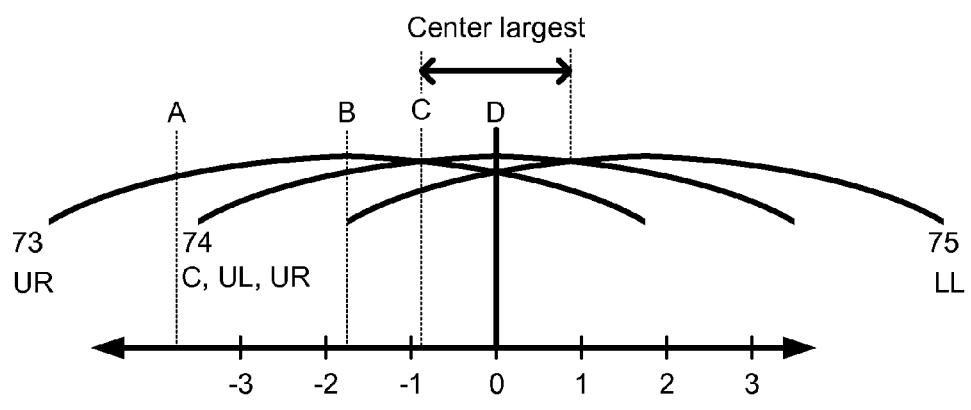
FIG. 11 illustrates sensed measurements along a wall 20 at various distances between the electrical wiring 10 and the device 100 as shown in FIGS. 10A to 10D, in accordance with the present invention.

FIG. 11 illustrates sensed measurements along a wall 20 at various distances between the electrical wiring 10 and the device 100 as shown in FIGS. 10A to 10D, in accordance with the present invention. The resulting curves 73, 74 and 75 illustrate that measurements from the center electrode C will be at least as large if not larger than all other sensor measurements. In this case, curve 73 shows sensor measurements from electrode UR, curve 74 shows sensor measurements from electrodes C, UL and UR, and curve 75 shows sensor measurements from electrode LL. While the electrical wiring 10 is near or over the center electrode C, sensor measurements are greater than at least two other sensor signals (namely, LL and UR).

Figure 12A:
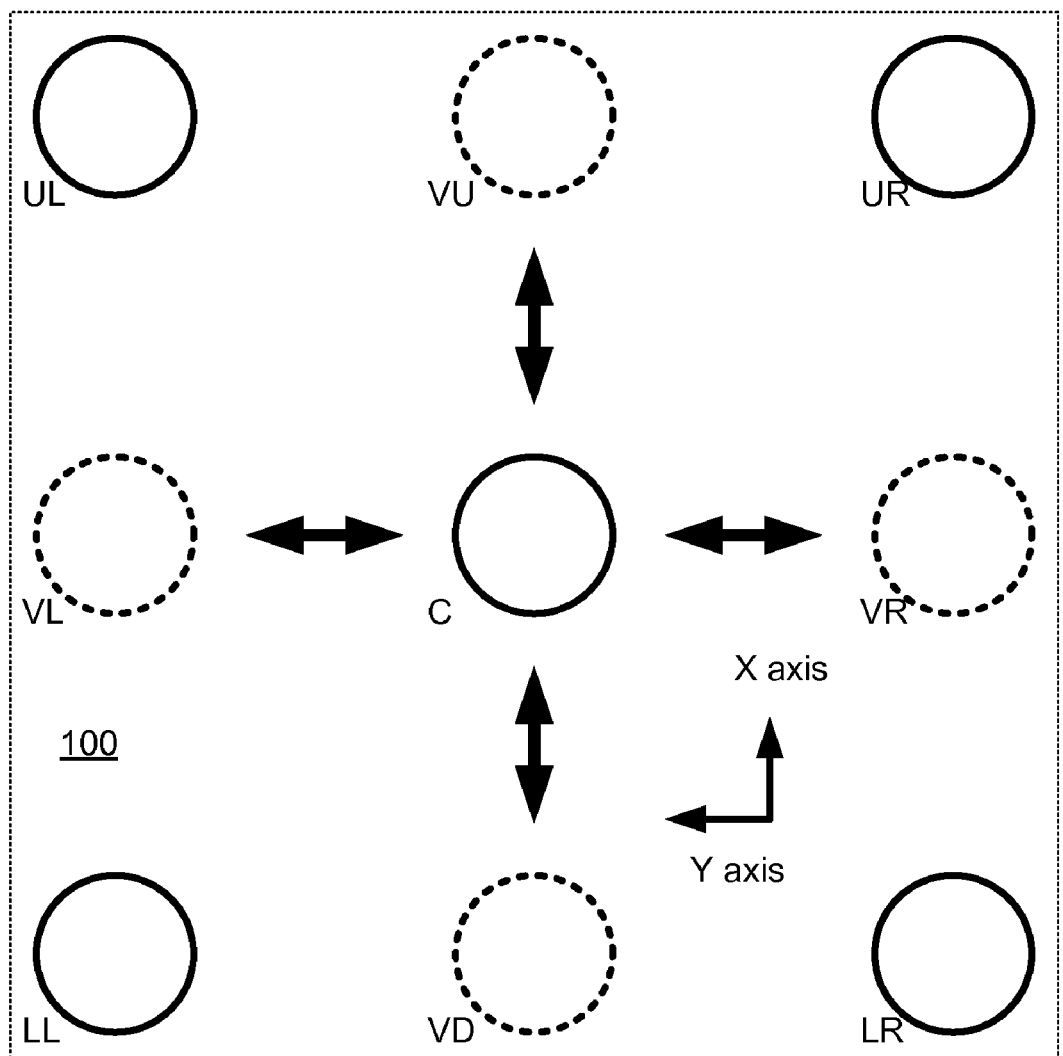

FIGS. 12A to 12C show placement and use of virtual sensors, in accordance with the present invention. The five-electrode configuration of FIG. 7 is supplemented with four virtual electrodes (VR, VD, VL and VU) as shown in FIG. 12A. Virtual electrode right "VR" is formed by combining measurement signals form UR and LR (the two electrodes to the right) and is conceptually placed directly between UR and LR. Similarly, virtual electrode down "VD" is formed by combining measurement signals form LR and LL (the two downward electrodes). Virtual electrode right "VL" is formed by combining measurement signals form LL and UL (the two electrodes to the left). Virtual electrode right "VU" is formed by combining measurement signals form UL and UR (the two upper electrodes).

The combination may be formed by a simple sum or a scaled sum such as an average. For example, if an average is used for combining and if the UR and LR provided the respective values of 8 and 12 volts, VR would be 10 volts (the average of 8 and 12). If a sum is used when combining, the values of UR=8 and LR=12 would result in VR=20. In this case, the amplifier (e.g., 120c in FIG. 13A below) associated with the center electrode C may have a gain of twice the gain values associated with the other amplifiers (e.g., 120a in FIG. 13A below).

An electrical wire may be viewed as having an X-axis component and a Y-axis component. For example, the electrical wiring at a 45 degree angle (e.g., position C in FIG. 10C) may be viewed as having one component vertically along the Y axis and one component horizontally along the X axis. Each component contributes a fraction of the total signal provided by the diagonal electrical wiring 10. As such, to electrodes along the X axis may be used to determine a gradient or a direction with respect to the X axis. For example, a virtual electrode located along the X axis (directly to the right or left) from the center electrode may be used to determine a relative distance or direction of the X axis contribution of the electrical wiring 10. Similarly, a virtual electrode displaced vertically from the center electrode may be used to determine a gradient or a direction with respect to the Y axis.

In FIG. 12B, a virtual electrode VR is computed as the average of UR and LR and is conceptually placed between UR and LR. The positioning of VR places it just to the right of the center electrode C along the X axis. The positioning of the vertical component of the electrical wiring 10 may be determined relative to C and VR. For example, when C and VR are equal and above a minimum threshold, the vertical component is directly between C and VR. Similarly, FIG. 12C shows a virtual electrode VU, which is computed as the average of UL and UR and is conceptually placed between UL and UR. The positioning of VU places it just above of the center electrode C along the Y axis. The positioning of the horizontal component of the electrical wiring 10 may be determined relative to C and VU. For example, when C and VU are equal and above a minimum threshold, the horizontal component is directly between C and VU.

FIG. 13 is a schematic diagram of a circuit for the device 100 of FIG. 7, in accordance with the present invention. A first sensor electrode 110a (UR) provides a raw sensor signal to a first amplifier 120a. The first amplifier amplifies the signal to generate a first amplified sensor signal. A second electrode 110b (LR) provides a raw sensor signal to a second amplifier 120b. The second amplifier amplifies the signal to generate a second amplified sensor signal. The first and second amplified signals are used as input values to a combiner 152. The combiner 152 may sum the input values. Alternatively, the combiner may average the input values. The resulting combined signal may be viewed as a signal from a virtual electrode (VR). A third sensor electrode 110c (C) provides a raw sensor signal to a third amplifier 120c. The first amplifier amplifies the signal to generate a third amplified sensor signal. This third amplified sensor signal is used as a reference signal, which is provided as a first input to a comparator 154. The combined signal (VR) is used as the second input signal to the comparator 154. The comparator provides a decision as an output signal. For example, when the reference signal is larger than the VR signal, the decision may be that an electrical wiring 10 is to the left of the virtual electrode VR. The circuitry of FIG. 13A may be duplicated to form additional virtual electrodes thus giving the hardware the circuitry necessary to narrow in on electrical wiring 10.

The gain of amplifiers 120 may be set during factory calibration to reduce the effect of differences in dielectric material immediately around the sensor electrode. By compensating for differences in dielectric characteristics around an electrode, measurements from each of the sensor electrodes may be more reliability compared.

Figure 13B:
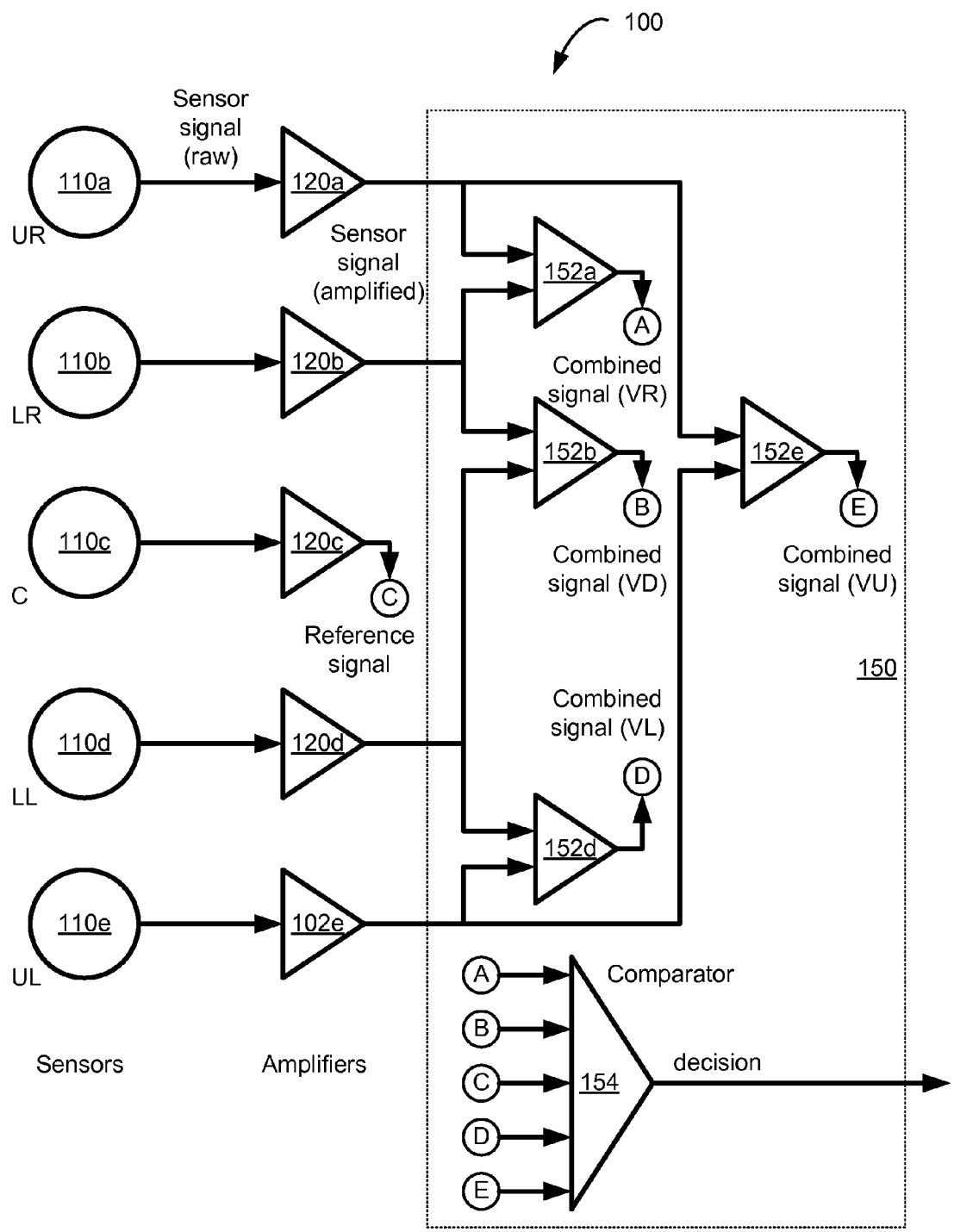
FIG. 13 is a schematic diagram of a circuit for the device 100 of FIG. 7, in accordance with the present invention.

In FIG. 13B, five sensor electrodes 110a to 110e form UR, LR, C, LL and UL, respectfully. Each sensor electrode is paired with a respective amplifier 120a to 120e. Each amplifier has an input port couple to a separate one of the sensor electrodes and an output port. Pairs of sensor electrode signals are combined by combiners 152a to 152d. Combiner 152a combines signals UR and LR. Combiner 152b combines signals LR and LL. Combiner 152c combines signals LL and UL. Combiner 152d combines signals UL and UR. As shown, the output signal from amplifier 120c is a reference signal and is not combined with another sensor electrode signal.

A comparator 154 has input ports connected to an output port of each combiners 152a to 152d as well as an input port to receive the reference signal from amplifier 120c. The comparator 154 may be provided by a single comparator, a configuration of comparators and additional common logic elements or instructions in a processor such as a microcontroller. The output signal from the comparator 154 provides a decision signal, which may be used by follow-on processing, a display or some other indicator.

In some embodiments, the comparator 154 provides a decision signal to indicate presence of electrical wiring 10 when the reference signal is greater than all of the combined signals. In other embodiments, the comparator 154 provides a decision signal to indicate presence of electrical wiring 10 when the reference signal is greater than at least two of the combined signals. The comparator may have hysteresis built in such that the decision signal does not flutter during a transition conditions.

Figure 14A:
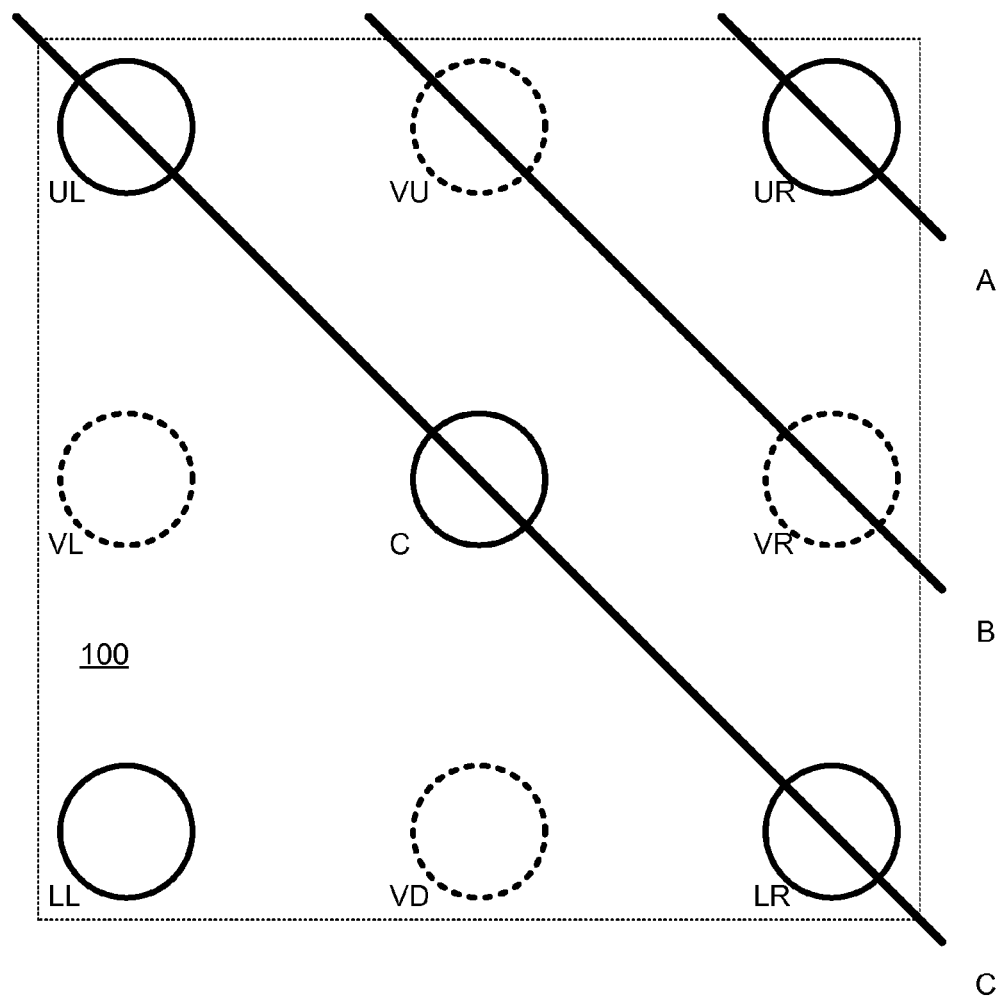
FIG. 14A shows virtual sensors and relative placement of the device 100 of FIG. 7 with respect to the electrical wiring 10, in accordance with the present invention.

FIG. 14A shows virtual sensors and relative placement of the device 100 of FIG. 7 with respect to the electrical wiring 10, in accordance with the present invention. The device 100 is positioned with respect to the electrical wiring 10 at a 45 degree angle. In a first position A, the electrical wiring is under sensor electrode UR. In a second position B, the electrical wiring 10 is under virtual electrodes VU and VR. In a third position C, the electrical wiring 10 is under sensor electrodes LR, C and UL.

Figure 14B:
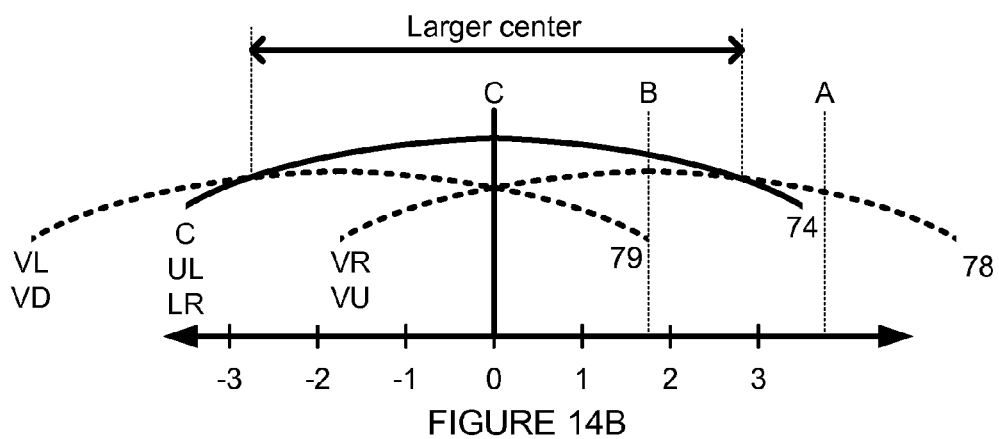
FIG. 14B illustrates sensed measurements along a wall 20 at various distances between the electrical wiring 10 and the device 100 as shown in FIG. 14A, in accordance with the present invention.

FIG. 14B illustrates sensed measurements along a wall 20 at various distances between the electrical wiring 10 and the device 100 as shown in FIG. 14A, in accordance with the present invention. Curve 74 represents measurement signals from the center electrode. Curve 78 represents virtual signals VR and VU formed by a combination of sensor electrode signals UR & LR and UL & UR, respectfully. Curve 79 represents virtual signal VL and VD formed by a combination of sensor electrode signals LL & UL and LR & LL, respectfully. Depending on the size or area of the sensor electrodes and the relative placement of the sensor electrodes, the virtual curves may have a single maximum (single hump as shown) or may have two maximums (two humps). For simplicity, the virtual curves are shown with a single hump and with dotted lines.

When the device 100 is at position A, curve 78 is largest. When the device 100 is at position B, curve 78 is at a maximum. When the device 100 is at position C, curve 74 is at a maximum. Note that each of the virtual curves (shown as dotted lines) have a maximum value that is less than the maximum value of curve 74, which represents the reference signal from the center electrode. The comparator 154 may set the decision indicator when the reference signal is greater than all of the virtual signals. Alternatively, the reference signal may be scaled (or equivalently the virtual signals may be scaled) such that the range in which the scaled reference signal is greater than the virtual signals is either larger or smaller to broaden or narrow the window where the electrical wiring 10 is deemed present.

Figure 15A:
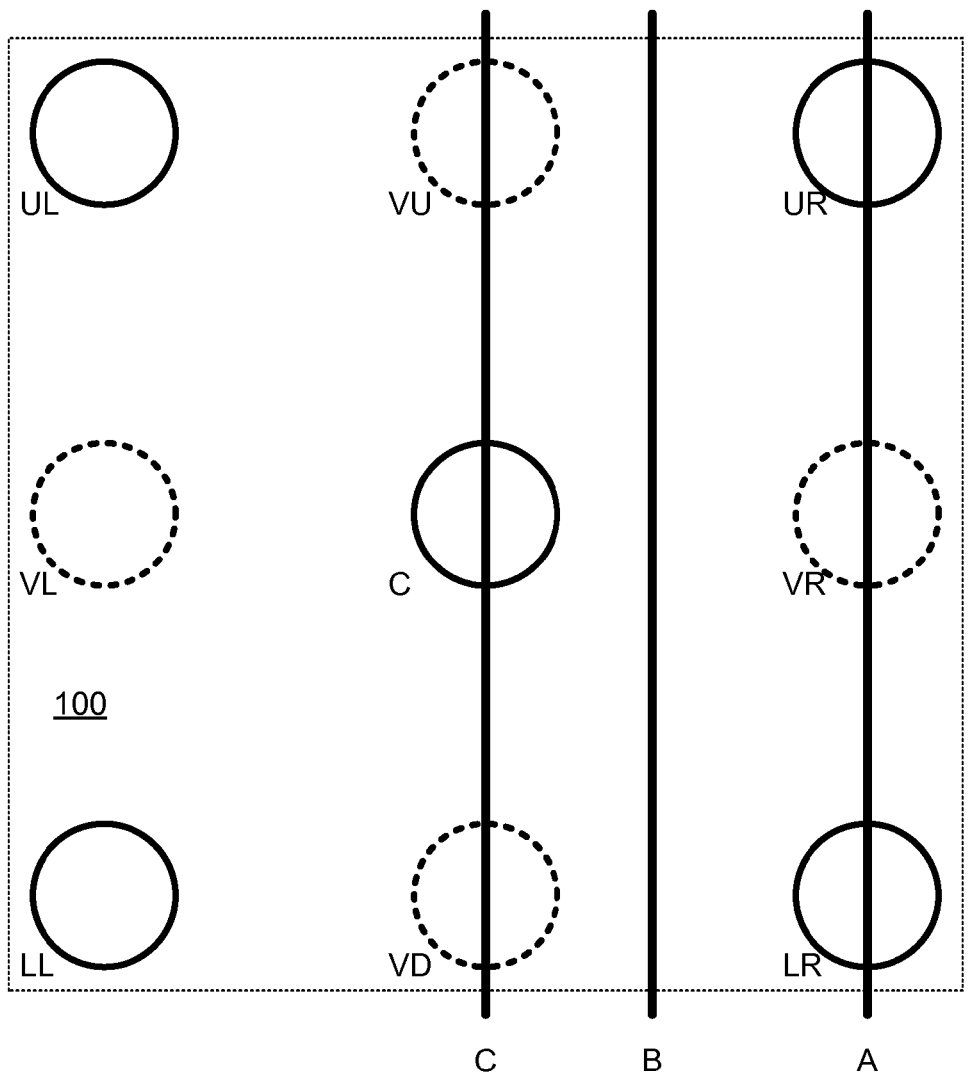
FIG. 15A shows virtual sensors and relative placement of the device 100 of FIG. 7 with respect to the electrical wiring 10, in accordance with the present invention.

FIG. 15A shows virtual sensors and relative placement of the device 100 of FIG. 7 with respect to the electrical wiring 10, in accordance with the present invention. The device 100 is positioned with respect to the electrical wiring 10 at a 90 degree angle. In a first position A, the electrical wiring is under sensor electrodes UR and LR as well as under virtual electrode VR. In a second position B, the electrical wiring 10 is between the center electrode C and sensor electrodes UR and LR. In a third position C, the electrical wiring 10 is under sensor electrode C as well as under virtual electrodes VD and VU.

Figure 15B:
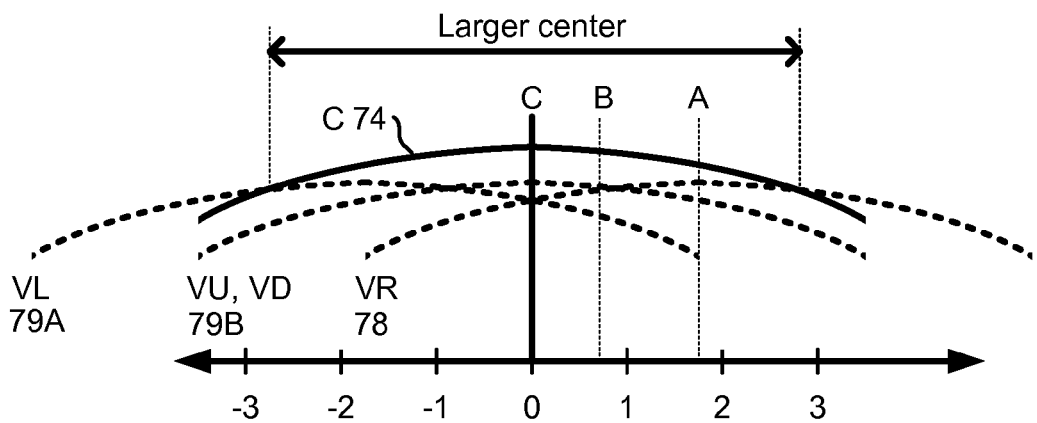
FIG. 15B illustrates sensed measurements along a wall 20 at various distances between the electrical wiring 10 and the device 100 as shown in FIG. 15A, in accordance with the present invention.

FIG. 15B illustrates sensed measurements along a wall 20 at various distances between the electrical wiring 10 and the device 100 as shown in FIG. 15A, in accordance with the present invention. Curve 74 represents measurement signals from the center electrode. Curve 78 represents virtual signal VR. Curve 79A represents virtual signal VL. Curve 79B represents virtual signals VU and VD.

When the device 100 is at position A, curve 78 is greater than any of the other curves. When the device 100 is at position B, curve 78 is at its maximum but curve 74 is shown having a greater value. When the device 100 is at position C, curve 74 is at a maximum. The comparator 154 may set the decision indicator as described above (e.g., when the reference signal C is greater than all of the virtual signals).

Figure 16:
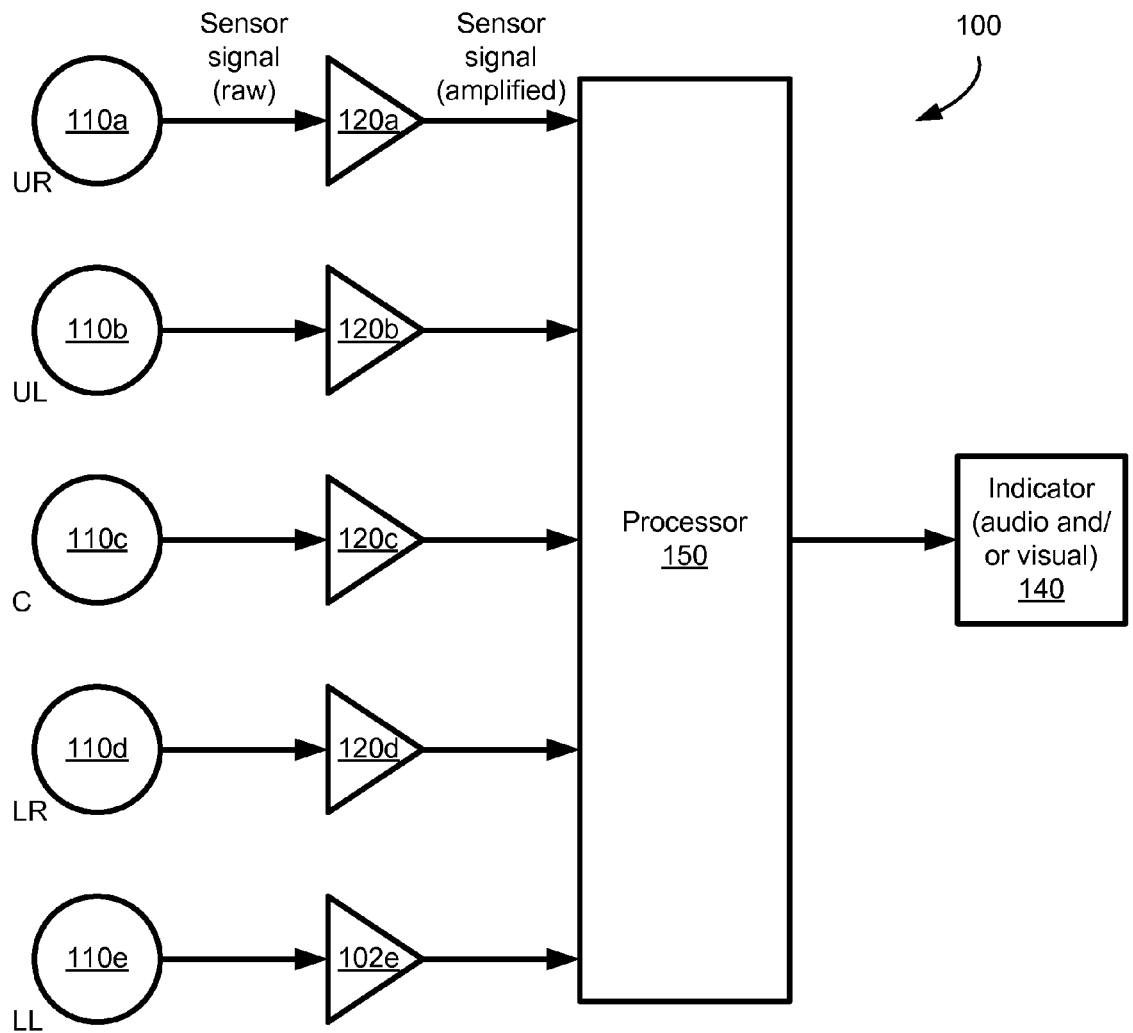
FIG. 16 is a schematic diagram of a circuit for the device 100 of FIG. 7, in accordance with the present invention.

FIG. 16 is a schematic diagram of a circuit for the device 100 of FIG. 7, in accordance with the present invention. The device 100 has five sensor electrodes 110a to 110e form by UR, LR, C, LL and UL, respectfully. Each sensor electrode is paired with a respective amplifier 120a to 120e. Each amplifier has an input port couple to a separate one of the sensor electrodes and an output port coupled to a processor 150. The processor has an analog-to-digital converter connected to each of the outputs of amplifiers 120a to 120e. The processor include instructions to digitize the amplified sensor electrode signals as well as to combine pairs of signals to form virtual signals, to compare virtual signals to a reference signal and to provide a decision signal to an indicator device 140, which provides an audio and/or visual indication of the presence of electrical wiring 10.

Figure 17:
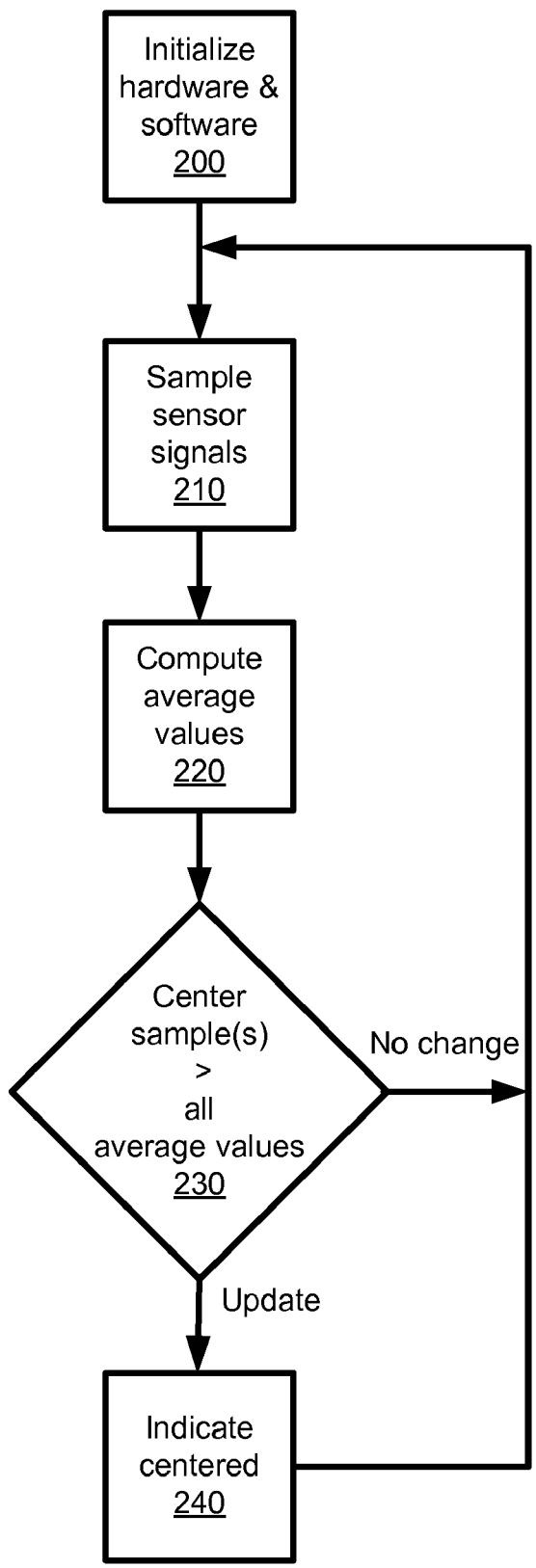
FIG. 17 shows a software flow for the device 100 of FIG. 7, in accordance with the present invention.

FIG. 17 shows a software flow for the device 100 of FIG. 7, in accordance with the present invention. At step 200, the processor 150 initializes the hardware and software. For example, the processor 150 executes instructions to setup the analog-to-digital converters for subsequent data capture.

At step 210, the processor 150 samples sensor electrode signals. The samples may be taken in a round-robin fashion or may be taken during one period of time. The processor may continue sampling the analog signals to form digital data. The processor 150 may analyze the digital data to find a local maximum (a maximum point in one or more cycles), which may be used by the combiner.

At step 220, the combining function is performed by averaging neighboring pairs of sensor electrodes. That is, measurements from UR and LR are combined to form VR, measurements from LR and LL are combined to form VD, measurements from LR and UL are combined to form VL, and measurements from UL and UR are combined to form VU. Assuming the amplifiers all provide a common amplification, the combined signals represent an average of the separate signals.

At step 230, the reference value from the center sensor electrode is compared to the virtual signals VR, VD, VL and VU to determine whether the reference signal is greater than the virtual signals. The comparison process may require that the reference signal be greater than a positive (or negative) threshold from each of the virtual signals. The comparison process may include a hysteresis process to minimize unwanted fluttering. The resulting decision may simply be an indication that the device is generally centered over electrical wiring 10. The resulting decision may also be an indication of direction to the electrical wiring 10. If not change is found (e.g., the device was not over any electrical wiring 10 before and still not over any electrical wiring 10), then the process returns to collect the next sensor sample at step 210.

At step 240, any change or update in the decision from step 230 may be indicated to an operator of the device 100. The indicator may be an audio indicator, such as a buzzer or speaker. In addition, the indicator may be a visual indicator, such as an LED, series of sequence of LEDs and/or display. Once the indicator has been updated, the process repeats by returning to collect the next sensor sample at step 210.

Figure 18A:
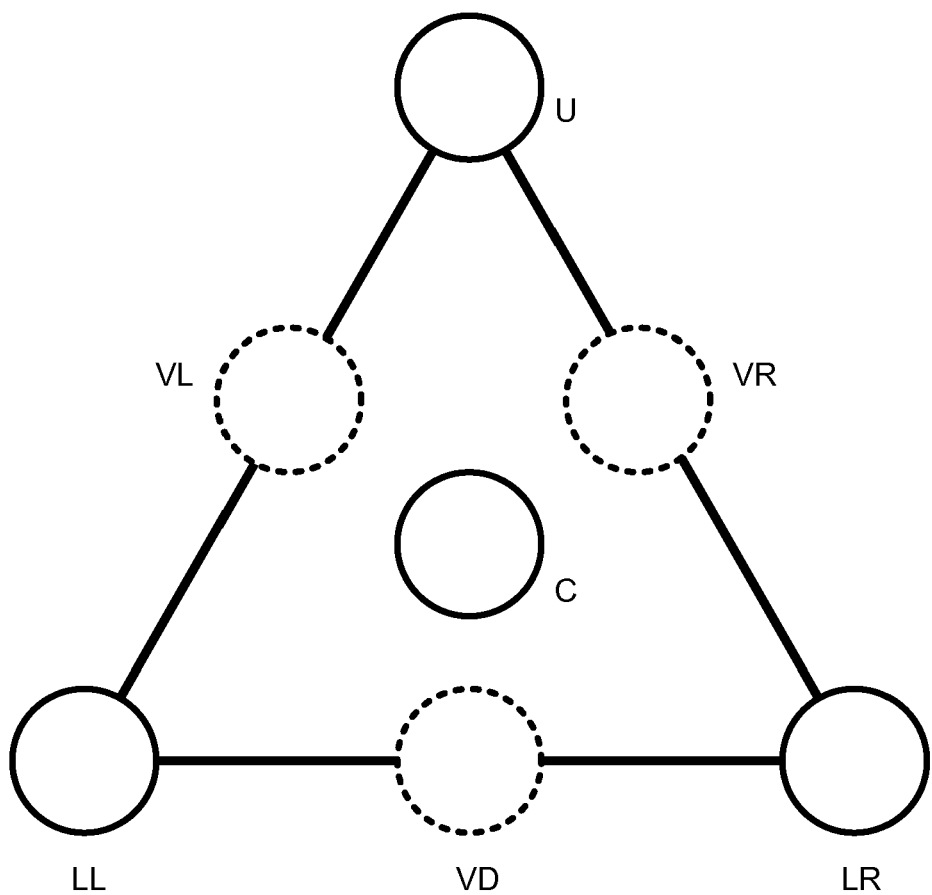
FIGS. 18A and 18B show an alternate embodiment, in accordance with the present invention.

FIG. 18A shows an alternate embodiment, in accordance with the present invention. The four-electrode configuration shown includes four sensor electrodes: an upper electrode (U); a lower-right electrode (LR); a lower-left electrode (LL); and a center electrode (C). Three virtual electrodes are also shown: virtual right (VR); virtual down (VD); and virtual left (VL). As described above, a virtual electrode is formed by combining two neighboring electrodes. VR is the combination of U and LR, VD is the combination of LR and LL, and VL is the combination of LL and U. The virtual electrodes and reference electrodes are balanced such that their magnitudes are equivalent. For example, the combination may be an average and the center measurements are not adjusted. Alternatively, the combination may be a sum and the center measurement are scaled by a factor of two.

Figure 18B:
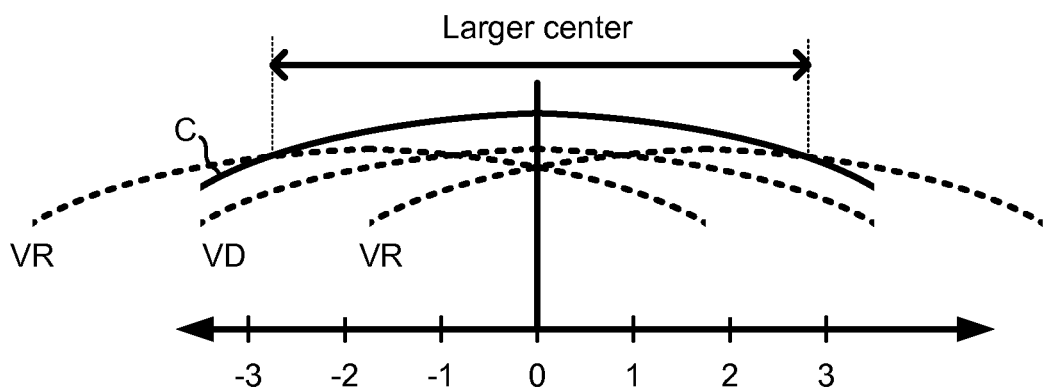

FIG. 18B illustrates sensed measurements along a wall 20 at various distances between the electrical wiring 10 (not shown) and the device 100 of FIG. 15A, in accordance with the present invention. A first curve (C) represents reference measurements from the center electrode. Curve VR represents virtual signal VR. Curve VL represents virtual signal VL. Curve VD represents virtual signals VU and VD. When the device 100 is over electrical wiring 10, the first curve (C) is greater than the virtual curves. A comparator accepting the virtual measurements and the reference measurements may indicate the present of electrical wiring 10 when C=max(C, CR, CD, CL) and where C is above a minimum threshold. The minimum threshold may be used to indicate the device is susceptible or in range of the electrical wiring 10.

A direction may be determined using virtual sensors. For example, a position-weighted average may be made with the results of the virtual sensors with respect to the reference electrode (C). In the case of FIG. 18A, a positional average of VR, VD and VL may be computed. The direction to the electrical wiring 10 may be in the direction of the positional average with respect to the position of the reference electrode (C). Alternatively, direction may be determined from the sensor electrode measurements themselves (i.e., before combining). For example, a direction may be indicated by which of the sensor electrodes gives the greatest measurement.

FIGS. 19A to 19D show yet another alternate embodiment, in accordance with the present invention. The device 100 includes three sensor electrodes: an upper electrode (U); a lower-right electrode (LR); and a lower-left electrode (LL). Respective pairs of the sensor electrodes may be combined as described above to form virtual electrodes: U and LR form a virtual-right electrode (VR); LR and LL form a virtual-lower or down electrode (VD); and LL and U form a virtual-left (VL) electrode. In the embodiment shown, no dedicated reference electrode exists. A sensor electrode acts as a reference electrode when the opposite facing pair of sensor electrodes have been combined to form a virtual electrode. Each electrode, in turn, acts as a reference electrode as described in more detail below.

Figure 19A:
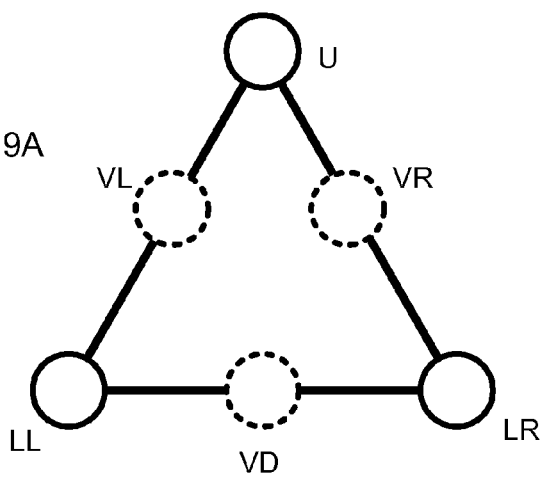
FIGS. 19A to 19D show yet another alternate embodiment, in accordance with the present invention.
Figure 19B:
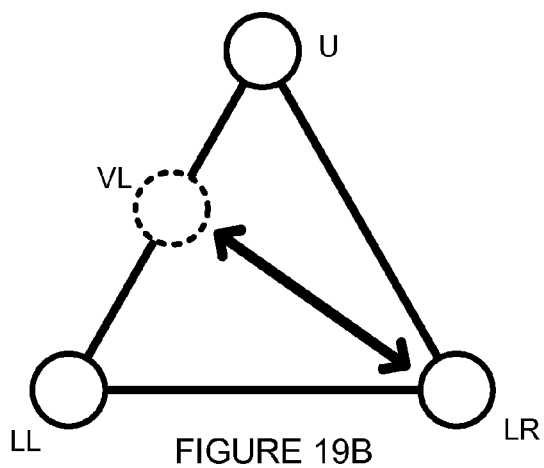
Figure 19C:
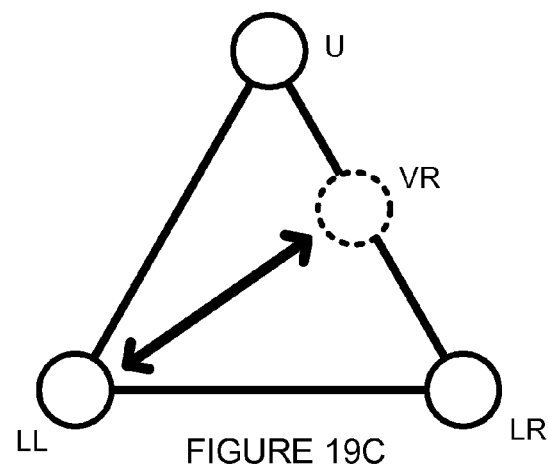
Figure 19D:
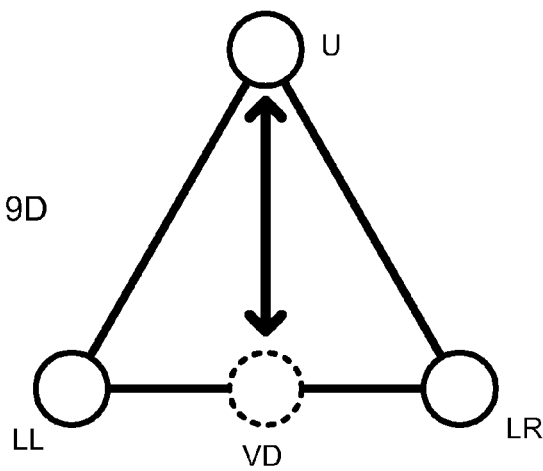

FIG. 19B shows a first phase of operation where computed data from virtual sensor VL is compared to measurement data from sensor electrode LR. FIG. 19C shows a second phase of operation where computed data from virtual sensor VR is compared to measurement data from sensor electrode LL. FIG. 19D shows a third phase of operation where computed data from virtual sensor VD is compared to measurement data from sensor electrode U.

During each phase, comparison data indicates a direction of sensed electrical wiring 10. For example, in phase one, if VL is greater than LR, then the electrical wire 10 may be closer to VL (or generally closer to the pair of sensor electrodes LL and U). In this case, a directional vector beginning at LR and in the direction of VL may be determined. In phase two, if VR is less than LL, then the electrical wire 10 may be closer to LL. A directional vector beginning at VR in the direction of LL may be determined. In phase three, if VD is less than U, then the electrical wire 10 may be closer to U. A directional vector beginning at VD in the direction of U may be determined.

As electrical wiring 10 gets close to and passes the device 100, one or more of the determined directional vectors should change in direction. For example, in a subsequent phase one, VL may become smaller than LR. This change in direction is an indication that electrical wiring 10 is in the vicinity of the device 10, therefore, the device 100 may indicate to an operator that electrical wiring 10 is nearby.

Additionally, the greatest of the raw and/or virtual sensor electrode measurements may be used to indicate a general direction to the electrical wire 10. Furthermore, a positional weighted average point may be computed to determine a gradient to the electrical wire 10.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A handheld device to sense electrical wiring, the device comprising:
    a plurality of sensor electrodes;
    a plurality of amplifiers each having an input port couple to a separate one of the plurality of sensor electrodes and each further having an output port;
    a combiner having a first input port coupled to a first one of the output ports of the plurality of amplifiers, a second input port coupled to a second one of the output ports of the plurality of amplifiers, and an output port;
    a comparator having a first input coupled to the output port of the combiner, a second input coupled to a third one of the output ports of the plurality of amplifiers, and an output port;
    an indicator responsive to a signal at the output port of the comparator;
    wherein the combiner comprises at least one of an averaging unit and an adder.

2. The device of claim 1, wherein the plurality of sensor electrodes comprise a plurality of electric field sensors.

3. The device of claim 1, wherein the plurality of sensor electrodes comprise a plurality of capacitive sensors.

4. The device of claim 1, further comprising:
    a corresponding plurality of analog-to-digital converters each having an input port coupled to a separate one of the output ports of the plurality of amplifiers;
    a processor having an input port coupled to the analog-to-digital converters, wherein the processor comprises the combiner and the comparator.

5. The device of claim 4, further comprising memory comprising instructions to:
    generate a first combined signal from a combination of a first signal from a first of the plurality of sensor electrodes with a second signal from a second of the plurality of sensor electrodes; and
    compare a third signal from a third of the plurality of sensor electrodes with the first combined signal.

6. The device of claim 1, wherein the plurality of amplifiers each provide a common gain.

7. The device of claim 1, wherein one of the plurality of sensor electrodes is a reference electrode, and wherein the reference sensor provides a reference signal.

8. The device of claim 7, wherein one of the plurality of amplifiers coupled to the reference electrode provides a first gain and each of the remaining plurality of amplifiers provide a second gain.

9. The device of claim 1, wherein each of the plurality of sensor electrodes comprise a separate circuit board.

10. The device of claim 1, further comprising a circuit board comprising the plurality of sensor electrodes.

11. The device of claim 1, further comprising:
    a second combiner having a first input port coupled to the second one of the output ports of the plurality of amplifiers, a second input port coupled to a fourth one of the output ports of the plurality of amplifiers, and an output port;
    wherein the output port of the second combiner is coupled to a third input port of the comparator.

12. The device of claim 11, further comprising:
    a third combiner having a first input port coupled to the fourth one of the output ports of the plurality of amplifiers, a second input port coupled to a fifth one of the output ports of the plurality of amplifiers, and an output port;
    wherein the output port of the third combiner is coupled to a fourth input port of the comparator.

13. The device of claim 11, further comprising:
    a fourth combiner having a first input port coupled to the fifth one of the output ports of the plurality of amplifiers, a second input port coupled to the first one of the output ports of the plurality of amplifiers, and an output port;
    wherein the output port of the third combiner is coupled to a fifth input port of the comparator.

14. A handheld device to sense electrical wiring, the device comprising:
    a plurality of sensor electrodes comprising at least three sensor electrodes;
    a plurality of amplifiers each having an input port couple to a separate one of the plurality of sensor electrodes and each further having an output port;
    an analog-to-digital converter having a plurality of input ports each coupled to a respective one of the output ports of the plurality of amplifiers and an output port;
    a processor coupled to receive data from the analog-to-digital converter and to execute instructions; and
    memory coupled to the processor, wherein the memory contains instructions for the processor to combine data from respective pairs of sensor electrodes from the plurality of sensor electrodes and to compare respective reference signal data to each of the combined data from the respective pairs of sensor electrodes;
    wherein the instructions for the processor to combine data comprises at least one of instructions for the processor to average and instructions for the processor to add.

15. The device of claim 14, wherein the at least three sensor electrodes comprises at least four sensor electrodes.

16. A method to sense electrical wiring, the method comprising:
    sensing input signals from a plurality of sensor electrodes;
    amplifying each of the sensed signals;
    combining a first pair of amplified signals resulting in a first combined signal, wherein the combining comprises at least one of averaging and adding;
    comparing a referenced signal to the first combined signal resulting in first comparison result;
    combining a second pair of amplified signals resulting in a second combined signal;
    comparing a referenced signal to the second combined signal resulting in second comparison result;
    determining a presence of the electrical wiring based on the first comparison result and second comparison result; and
    indicating the presence of the electrical wiring.

17. The method claim 16, further comprising:
    combining a third pair of amplified signals resulting in a third combined signal; and
    comparing a referenced signal to the third combined signal resulting in third comparison result;
    wherein the act of determining is further based on the third comparison result.

18. The method claim 17, further comprising:
combining a fourth pair of amplified signals resulting in a fourth combined signal; and
comparing a referenced signal to the fourth combined signal resulting in fourth comparison result;
wherein the act of determining is further based on the fourth comparison result.

19. The method claim 16, wherein the act of combining the first pair of amplified signals comprises averaging the first pair of amplified signals.

20. The method claim 16, wherein:
the act of comparing the referenced signal to the first combined signal comprises determining whether the reference signal is larger than the first combine signal;
the act of comparing the referenced signal to the second combined signal comprises determining whether the reference signal is larger than the second combine signal; and
the act of determining the presence of the electrical wiring based on the first comparison result and second comparison result comprises determining the reference signal is larger in both comparisons.

21. The method of claim 16, wherein the reference signal resulting in the first comparison result is equal to the reference signal resulting in the second comparison result.

22. The method of claim 16, wherein the reference signal resulting in the first comparison result is different from the reference signal resulting in the second comparison result.

23. The method of claim 16, wherein the act of comparing the reference signal to the first combined signal comprises determining the reference signal is greater than a threshold above the first combined signal.

24. The method of claim 16, further comprising indicating a direction to the electrical wiring.

* * * * *